(No Model.)
I. M. RICHARDSON.
THILL COUPLING BOLT.
No. 313,242. Patented Mar. 3, 1885.
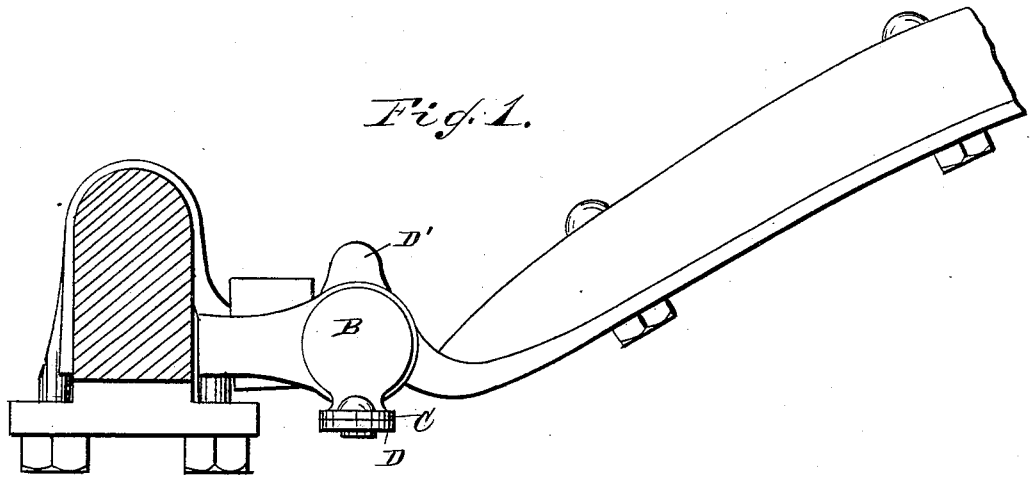
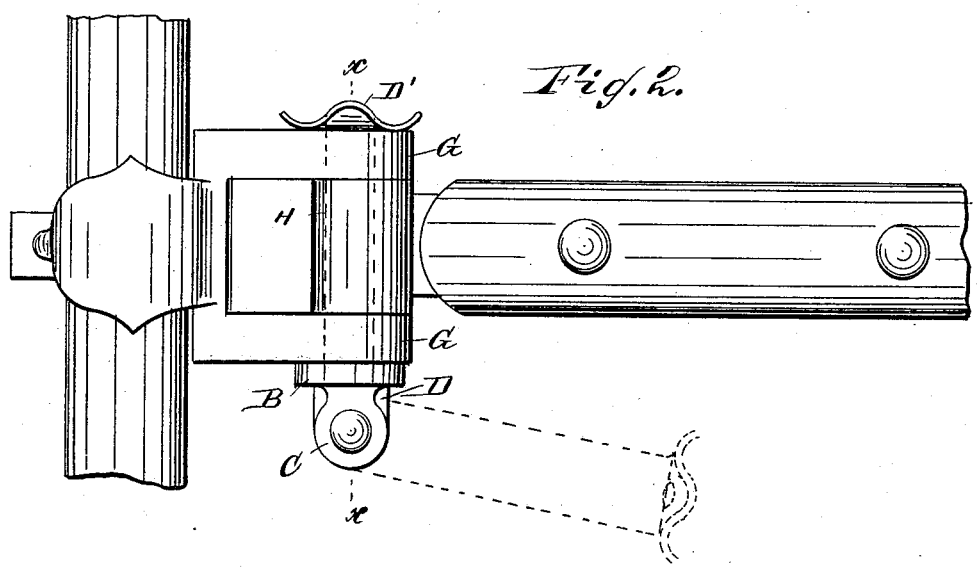
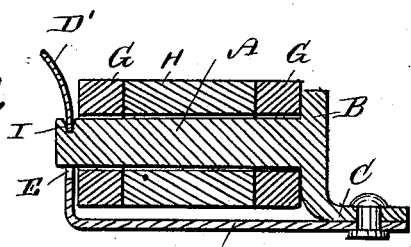
WITNESSES:
Theo. G. Hoster
C. Sedgwick
INVENTOR:
I. M. Richardson
BY Munn & Co
ATTORNEYS.

UNITED STATES PATENT OFFICE.

IRA M. RICHARDSON, OF LITTLETON, NEW HAMPSHIRE.

THILL-COUPLING BOLT.

SPECIFICATION forming part of Letters Patent No. 313,242, dated March 3, 1885.

Application filed September 24, 1884. (No model.)

*To all whom it may concern:*

Be it known that I, IRA M. RICHARDSON, of Littleton, in the county of Grafton and State of New Hampshire, have invented a new and Improved Bolt-Lock, of which the following is a full, clear, and exact description.

The object of my invention is to provide a new and improved device for locking bolts in place, thus preventing them from dropping out accidentally, and also to facilitate inserting and removing of the bolt.

The invention consists in the combination, with a bolt, of a spring-strip pivoted to one end of the bolt, and having its free end bent up and provided with an aperture for receiving the free end of the bolt, thus locking the bolt in place.

Reference is to be had to the accompanying drawings, forming a part of this specification, in which similar letters of reference indicate corresponding parts in all the figures.

Figure 1 is an end view of the bolt, showing it applied as a thill-coupler. Fig. 2 is a plan view of the same. Fig. 3 is a longitudinal sectional elevation of the same on the line $x\ x$, Fig. 2.

The bolt A is provided on one end with the head B, on the bottom of which a downwardly and outwardly projecting tongue, C, is formed, to the under side of which an L-shaped strip, D, is pivoted, the upwardly-projecting part D' of the strip being bent outward, as shown at D', and provided with a longitudinal slot, E, adapted to receive the free end of the bolt A, which has a transverse notch or groove, I, in its upper edge at the free end.

The device is used in the following manner: The bolt is passed through the jaws G and eye H, or through any other parts that are to be pivoted together, the spring-strip D is swung under the bolt until the end part, D', of the strip rests against the end of the bolt, and then the part D' is pushed upward sufficiently to permit the end of the bolt to pass into or through the slot E. The part D' then snaps down, causing the top edge of the slot E to pass into the notch or groove I, thus locking the end of the spring-strip to the bolt.

To remove the bolt, the part D' must first be pressed upward to disengage it from the bolt A. Then the said part D' is pulled outward, and the strip D is swung to project in the inverse direction of the bolt A, thus permitting of withdrawing the bolt. The spring-strip D is the lock, and in all cases locks the bolt in such a manner that it cannot be withdrawn until the spring-strip D is removed, and cannot drop out accidentally.

The above-described bolt can be used for various purposes where locked bolts are required or where the bolts must be removed and replaced rapidly.

Having thus described my invention, I claim as new and desire to secure by Letters Patent—

1. The combination, with a bolt, of a strip made of spring material and pivoted to one end of the bolt, the said strip having its spring end bent up and provided with an aperture for receiving the free end of the bolt, substantially as herein shown and described.

2. The combination, with the bolt A, having a head, B, provided with a tongue, C, projecting from the end of the head parallel with the bolt, of the strip D, made of spring material and pivoted to the tongue C, and having its free end bent up and provided with an aperture for receiving the free end of the bolt, substantially as herein shown and described.

3. The combination, with the bolt A, having at one end a head, B, provided with a tongue, and having a notch or groove, I, in the opposite end, of a spring-strip pivoted to the tongue and having its free end bent up and provided with an aperture, substantially as herein shown and described.

IRA M. RICHARDSON.

Witnesses:
 EDGAR TATE,
 BENJAMIN F. HOLSKE.